US006813577B2

(12) United States Patent
Yoshino et al.

(10) Patent No.: US 6,813,577 B2
(45) Date of Patent: Nov. 2, 2004

(54) SPEAKER DETECTING DEVICE

(75) Inventors: Hajime Yoshino, Tokorozawa (JP); Kazuya Tsukada, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 79 days.

(21) Appl. No.: 10/131,464

(22) Filed: Apr. 25, 2002

(65) Prior Publication Data

US 2002/0161543 A1 Oct. 31, 2002

(30) Foreign Application Priority Data

Apr. 27, 2001 (JP) ....................................... 2001-133573

(51) Int. Cl.[7] ................................................ G06F 13/14

(52) U.S. Cl. ........................ 702/111; 702/112; 702/116; 702/124

(58) Field of Search ................................. 702/112, 116, 702/124, 182, 183, 39, 48, 103, 111, 191, 193; 84/477 R; 181/119; 704/251, 56, 57, 275; 600/587; 381/58

(56) References Cited

U.S. PATENT DOCUMENTS

| | | | | |
|---|---|---|---|---|
| 5,792,072 A | * | 8/1998 | Keefe | 600/559 |
| 5,920,840 A | * | 7/1999 | Satyamurti et al. | 704/267 |
| 6,219,645 B1 | * | 4/2001 | Byers | 704/275 |
| 6,560,350 B2 | * | 5/2003 | Rhoads | 382/100 |
| 6,570,991 B1 | * | 5/2003 | Scheirer et al. | 381/110 |
| 2002/0010587 A1 | * | 1/2002 | Pertrushin | 704/275 |
| 2002/0154787 A1 | * | 10/2002 | Rice et al. | 381/124 |
| 2003/0055635 A1 | * | 3/2003 | Bizjak | 704/225 |

FOREIGN PATENT DOCUMENTS

| | | |
|---|---|---|
| EP | 0 575 619 | 12/1993 |
| EP | 1 081 694 | 3/2001 |
| JP | 10199126 | 7/1998 |
| JP | 10208375 | 8/1998 |
| JP | 10326454 | 12/1998 |
| JP | 2000048474 | 2/2000 |
| JP | 2000050565 | 2/2000 |
| JP | 2001043664 | 2/2001 |
| WO | 97/01168 | 1/1997 |
| WO | 00/21090 | 4/2000 |

* cited by examiner

*Primary Examiner*—Marc S. Hoff
*Assistant Examiner*—Felix Suarez
(74) *Attorney, Agent, or Firm*—Young & Thompson

(57) ABSTRACT

By the speaker detecting device, the test signal is supplied to the output terminal to which the speaker is to be connected. If a speaker is connected to the output terminal, the test sound is output via the speaker. If no speaker is connected to the output terminal, no test sound is output. The test sound detecting unit detects the test sound in the acoustic space and compares the signal level of the test sound with the predetermined threshold level, thereby to judge whether or not a speaker is connected to the output terminal.

11 Claims, 9 Drawing Sheets

SPEAKER DETECTING DEVICE

BACKGROUND OF THE INVENTION

1. Field of the Invention

This invention relates to an audio system using a plurality of speakers to create a high-quality sound field space, and more particularly to a technique for automatically detecting state of speaker connection to the audio system.

2. Description of Related Art

For an audio system to provide a high-quality sound field space, it is required to automatically create a sound field space with presence by using a plurality of speakers. Therefore, it is necessary to set the configuration of the speaker system used in the audio system, in advance, in the audio system.

Conventionally, a user connects a plurality of speakers to the audio system and then manually inputs the speaker system configuration to the audio system.

As a method of automatically detecting the speaker system configuration, it is conceivable to detect impedance variation of the audio system viewed from the side of the amplifier in the audio system so that the audio system can automatically detect the presence or absence of the speaker. Namely, since the impedance of the audio system viewed from the amplifier side changes according to the presence or absence of the speaker connected, the presence or absence of the speaker can be detected by detecting the impedance variation in the case a predetermined test signal is output. However, the above-described method requires an exclusive hardware to detect the presence or absence of the speaker.

SUMMARY OF THE INVENTION

It is an object of the present invention to provide a speaker detecting device capable of automatically detecting speakers connected to the audio system, without being affected by environmental noise.

According to one aspect of the present invention, there is provided a speaker detecting device including: an output terminal for outputting a signal to drive a speaker; a test signal supplying unit for supplying the test signal to the output terminal; a test sound detecting unit, installed in an acoustic space in which the speaker is installed, for detecting a test sound corresponding to the test signal; and a speaker existence judging unit for judging whether or not a speaker is connected to the output terminal by comparing a signal level of the test sound, detected by the test sound detecting unit when the test signal supplying unit supplies the test signal to the output terminal, with a predetermined threshold level.

According to the speaker detecting device thus configured, the test signal is supplied to the output terminal to which the speaker is to be connected. If a speaker is connected to the output terminal, the test sound is output via the speaker. If no speaker is connected to the output terminal, no test sound is output. The test sound detecting unit detects the test sound in the acoustic space and compares the signal level of the test sound with the predetermined threshold level, thereby to judge whether or not a speaker is connected to the output terminal.

The speaker detecting device may further include: an environmental noise detecting unit for detecting environmental noise in the acoustic space; and an optimum frequency band determining unit for determining an optimum frequency band of the test signal by analyzing a level of the environmental noise in terms of spectrum. In that case, the speaker existence judging unit may compare the level of the signal in the optimum frequency band, out of the signals detected by the test sound detecting unit, with the predetermined threshold level. By this, since the optimum frequency band is determined based on the spectrum analysis of the environmental noise, the speaker existence can be judged by using the frequency band with small environmental noise.

The optimum frequency band determining unit may determine the frequency band having a highest acoustic S/N ratio as the optimum frequency band. Thus, the accuracy in the speaker existence detection may be improved.

The optimum frequency band determining unit may include: a unit for storing a predetermined signal curve data; a unit for detecting the level of the environmental noise detected by the environmental noise detecting unit for each of multiple frequency bands to produce a noise curve data; and a unit for determining the frequency band having the highest acoustic S/N ratio as the optimum frequency band by comparing the curve data with the noise curve data. With this configuration, since the optimum frequency band is determined based on the signal curve data determined in consideration of auditory sensitivity of human being and the environmental noise data, it is possible to prevent a person in the acoustic space from feeling uncomfortable by the test sound.

The speaker detecting device may further include a threshold level setting unit for setting a level between the signal curve data and the noise curve data in the optimum frequency band to the predetermined threshold level. Thus, an appropriate threshold value may be set based on the actual S/N ratio in the optimum frequency band.

The speaker existence judging unit may judge the existence of the speaker based on the signal level in the optimum frequency band when the level of the environmental noise is larger than a predetermined reference level, and may judge the existence of the speaker based on the signal level of all frequency bands when the level of the environmental noise is smaller than the predetermined reference level. By this, when the environmental noise is large, the test signal of the optimum frequency band is used to accurately judge the speaker existence. When the environmental noise is small, not only the optimum frequency band, the test signal of all frequency bands is used to quickly detect the speaker existence.

The test signal supplying unit may supply only a component of the test signal in the optimum frequency band to the output terminal. By this, it is possible to avoid that a person in the acoustic space feels uncomfortable due to the unnecessarily large sound by reproducing the component that does not contribute to the speaker existence judgment.

The test sound detecting unit and the environmental noise detecting unit may be integrally configured as a single acoustic detecting unit. Thus, the configuration needed for the speaker detection may be simplified.

According to another aspect of the present invention, there is provided a program storage device readable by a computer having an output terminal for outputting a signal to drive a speaker and tangibly embodying a program of instructions executable by the computer to control the computer to function as a speaker detecting device including: a test signal supplying unit for supplying the test signal to the output terminal; a test sound detecting unit, installed in an acoustic space in which the speaker is installed, for detecting a test sound corresponding to the test signal; and a speaker existence judging unit for judging whether or not a speaker is connected to the output terminal by comparing a signal level of the test sound, detected by the test sound detecting unit when the test signal supplying unit supplies the test signal to the output terminal, with a predetermined threshold level.

According to still another aspect of the present invention, there is provided a computer data signal embodied in a carrier wave and representing a series of instructions which causes a computer, having an output terminal for outputting a signal to drive a speaker, to function as a speaker detecting device including: a test signal supplying unit for supplying the test signal to the output terminal; a test sound detecting unit, installed in an acoustic space in which the speaker is installed, for detecting a test sound corresponding to the test signal; and a speaker existence judging unit for judging whether or not a speaker is connected to the output terminal by comparing a signal level of the test sound, detected by the test sound detecting unit when the test signal supplying unit supplies the test signal to the output terminal, with a predetermined threshold level.

By reading the program into computer and executing it, the computer may function as the above-described speaker detecting device.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

[1] System Configuration

Figure 1:
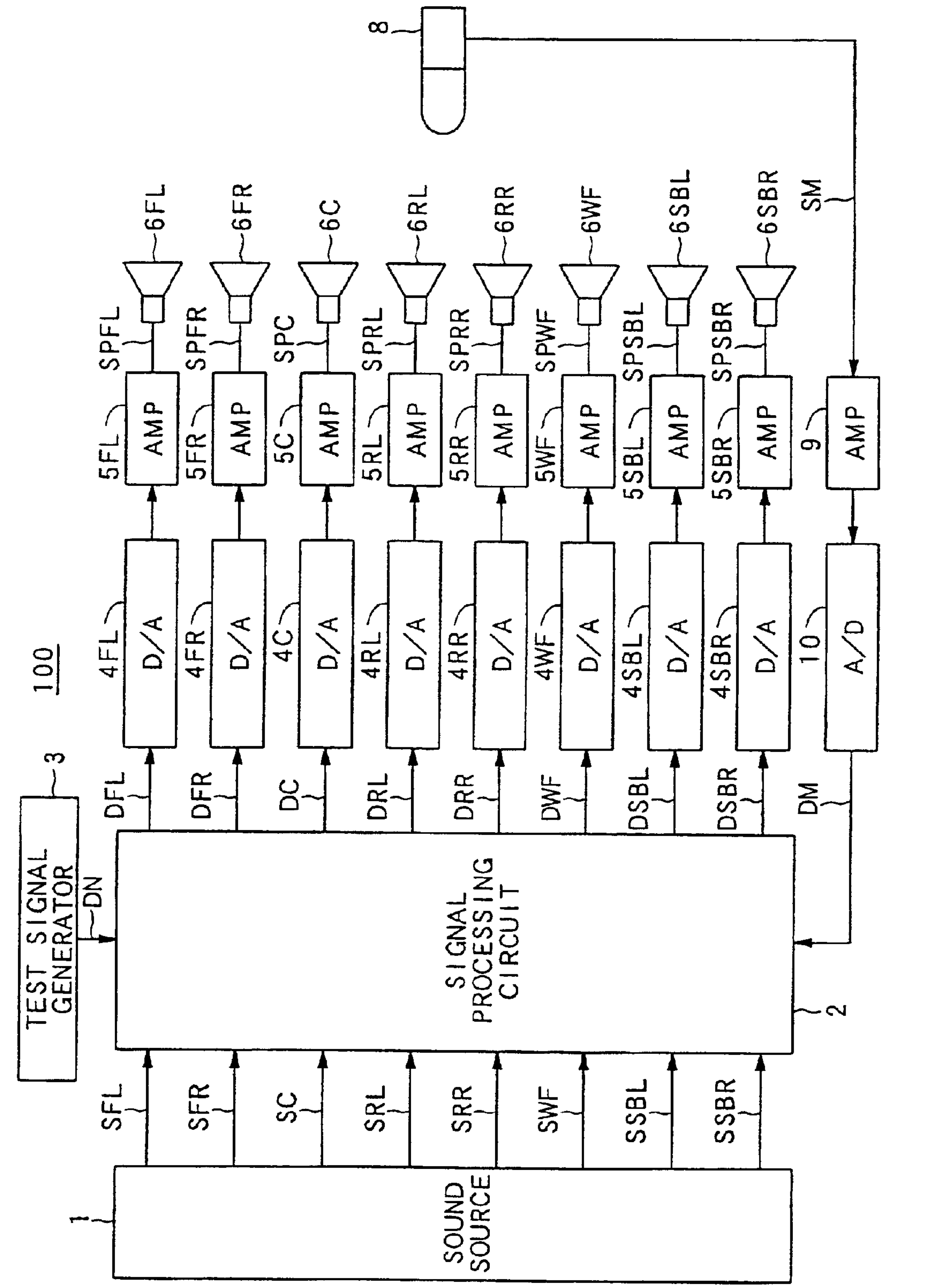
FIG. 1 is a block diagram showing a configuration of an audio system employing a speaker detecting device according to an embodiment of the present invention.

A preferred embodiment of a speaker detecting device according to the present invention will now be described below with reference to the attached drawings. FIG. 1 is a block diagram showing an audio system employing the speaker detecting device according the embodiment of the invention.

In FIG. 1, the audio system 100 includes a sound source 1 such as a CD (Compact Disc) player or a DVD (Digital Video Disc or Digital Versatile Disc) player, a signal processing circuit 2 to which the sound source 1 supplies digital audio signals SFL, SFR, SC, SRL, SRR, SWF, SSBL and SSBR via the multi-channel signal transmission path, and a test signal generator 3.

While the audio system 100 includes the multi-channel signal transmission paths, the respective channels are referred to as "1st-channel" to "8th-channel" in the order from the top to the bottom in FIG. 1, according to need. In addition, the subscripts of the reference number are omitted to refer to all of the multiple channels when the signals or components are expressed. On the other hand, the subscript is put to the reference number when a particular channel or component is referred to. For example, the description "digital audio signals S" means the digital audio signals SFL to SSBR, and the description "digital audio signal SFL" means the digital audio signal of only the FL-channel.

Further, the audio system 100 includes D/A converters 4FL to 4SBR for converting the digital output signals DFL to DSBR of the respective channels processed by the signal processing by the signal processing circuit 2 into analog signals, and amplifiers 5FL to 5SBR for amplifying the respective analog audio signals output by the D/A converters 4FL to 4SBR. In this system, the analog audio signals SPFL to SPSBR after the amplification by the amplifiers 5FL to 5SBR are supplied to the multi-channel speakers 6FL to 6SBR positioned in a listening room 7, shown in FIG. 8 as an example, to output sounds.

The audio system 100 also includes a microphone 8 for collecting reproduced sounds at the listening position RV in the listening room 7, an amplifier 9 for amplifying a collected sound signal SM output from the microphone 8, and an A/D converter 10 for converting the output of the amplifier 9 into a digital collected sound data DM to supply it to the signal processing circuit 2.

Figure 8:
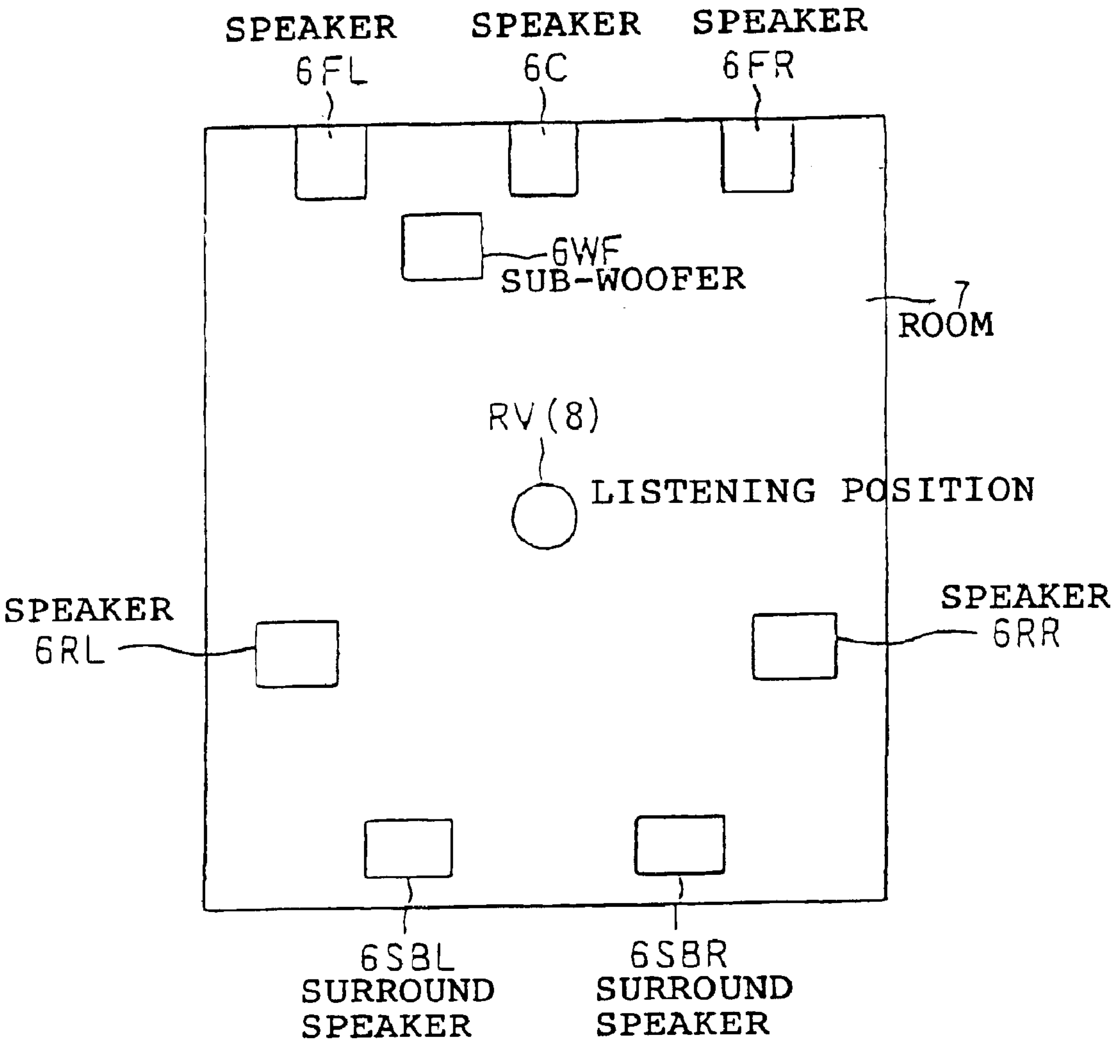
FIG. 8 is a diagram showing an example of speaker arrangement in a certain sound field environment.

As shown in FIG. 8, the audio system 100 activates full-band type speakers 6FL, 6FR, 6C, 6RL, 6RR having frequency characteristics capable of reproducing sound for substantially all audible frequency bands, a speaker 6WF having a frequency characteristic capable of reproducing only low-frequency sounds and surround speakers 6SBL and 6SBR positioned behind the listener, thereby creating sound field with presence around the listener at the listening position RV.

With respect to the position of the speakers, as shown in FIG. 8, for example, the listener places the two-channel, left and right speakers (a front-left speaker and a front-right speaker) 6FL, 6FR and a center speaker 6C, in front of the listening position RV, according to the listener's taste. Also the listener places the two-channel, left and right speakers (a rear-left speaker and a rear-right speaker) 6RL, 6RR as well as two-channel, left and right surround speakers 6SBL, 6SBR behind the listening position RV, and further places the sub-woofer 6WF exclusively used for the reproduction of low-frequency sound at any position.

Figure 2:
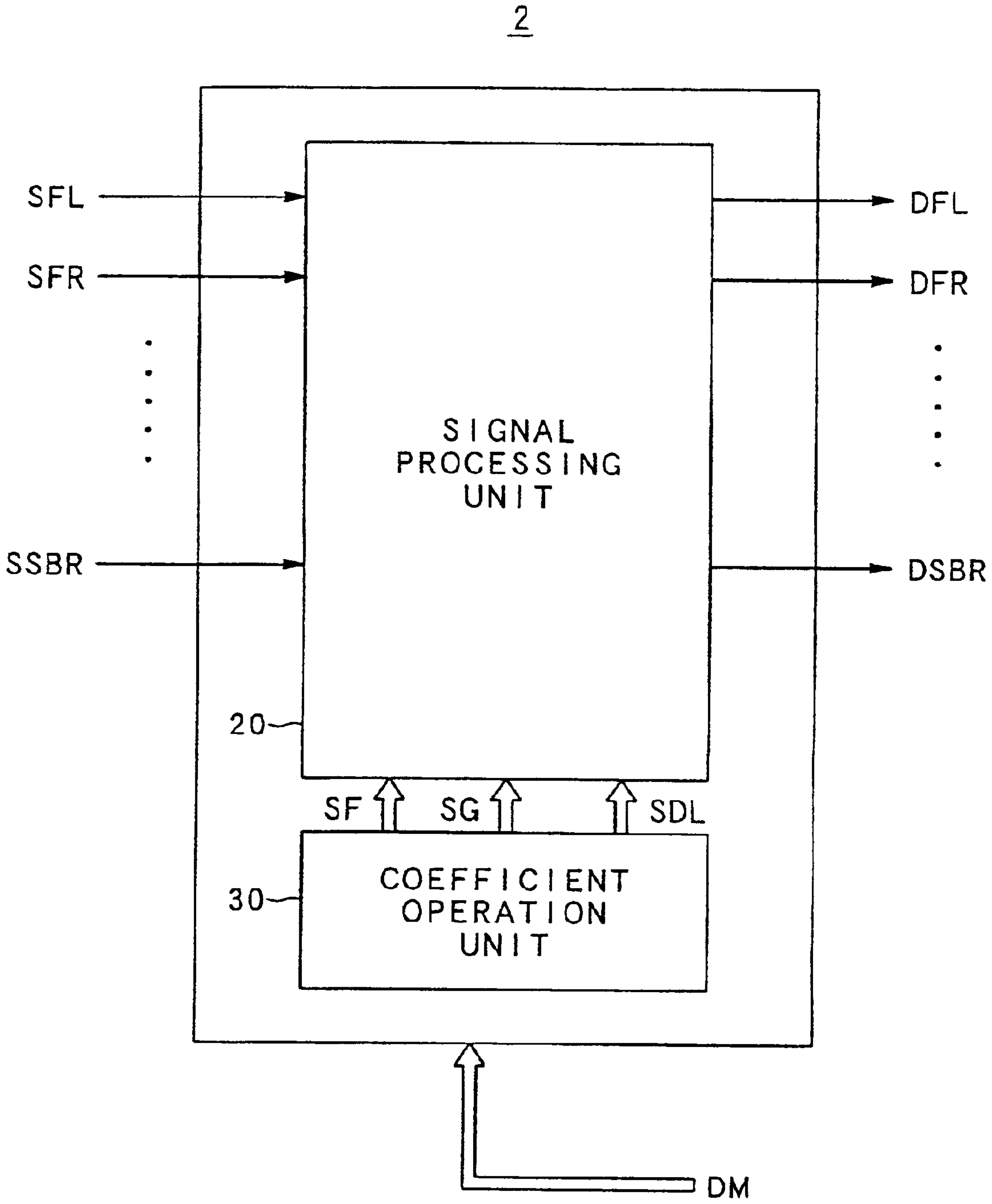
FIG. 2 is a block diagram showing an internal configuration of a signal processing circuit shown in FIG. 1.

The signal processing circuit 2 may have a digital signal processor (DSP), and roughly includes a signal processing unit 20 and a coefficient operating unit 30 as shown in FIG. 2.

The audio system shown in FIG. 1 operates in two modes. One is a sound source reproduction mode in which the audio signal output by the sound source shown in FIG. 1 is reproduced from a plurality of speakers. The other mode is a speaker detection mode, which is executed prior to the sound source reproduction mode. In the speaker detection mode, the existence, i.e., the presence or the absence of the speaker connected to the audio system 100 is automatically judged.

In the sound source reproduction mode, the signal processing unit 20 receives the multi-channel digital audio signals from the sound source 1 reproducing sound from various sound sources such as CD, DVD or else, performs necessary processing and outputs the digital output signals DFL to DSBR. In the speaker detection mode, the signal processing unit 20 outputs the test signal from the test signal generator 3 via the transmission paths of the respective channels. Further, the signal processing unit 20 collects the test signal thus output by the microphone 8, and returns the test signal to the signal processing circuit 2. The signal processing circuit 2 processes the returned test signal to detect the existence of the speaker.

Figure 3:
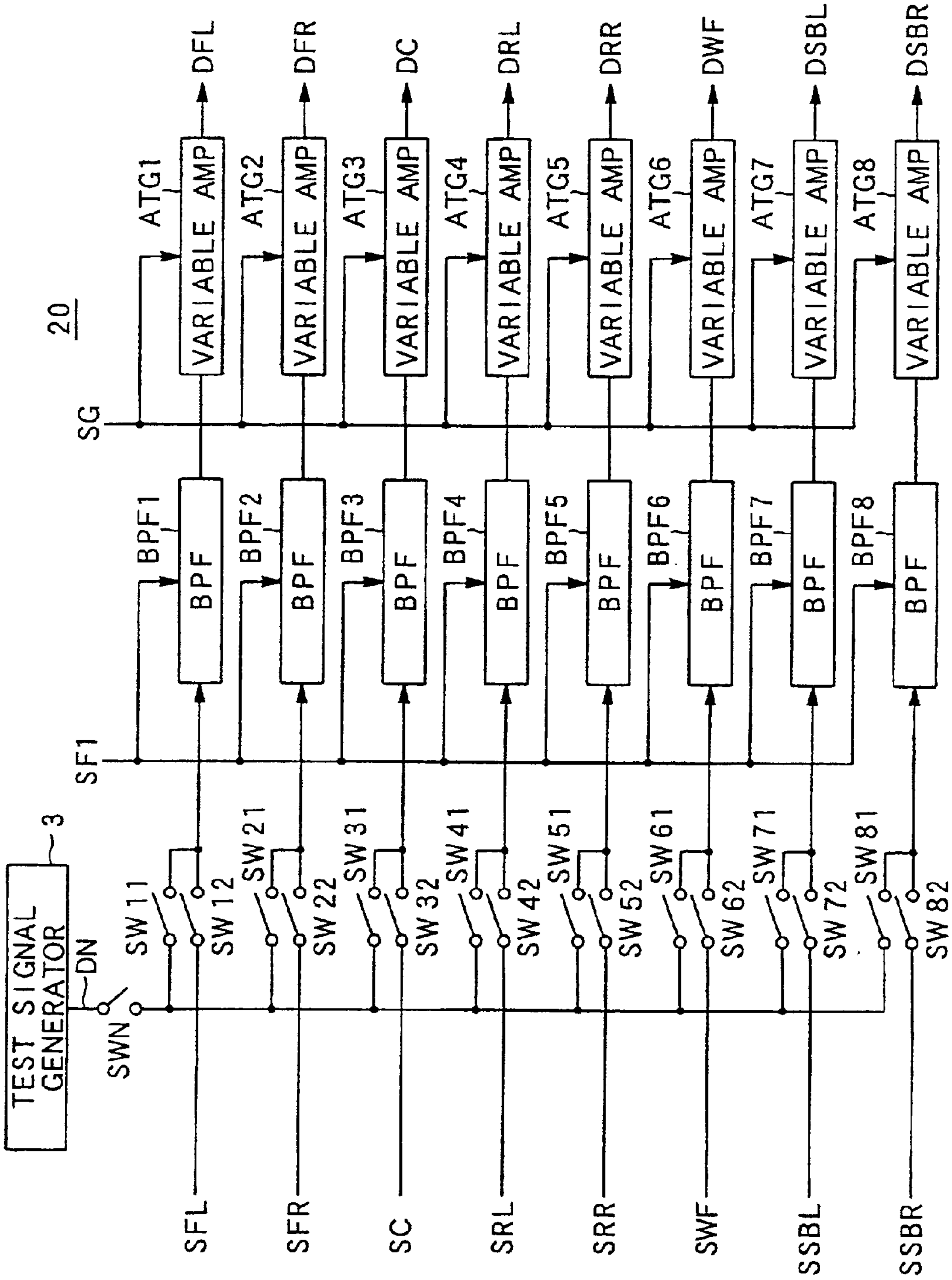
FIG. 3 is a block diagram showing a configuration of a signal processing unit shown in FIG. 2.

FIG. 3 shows the configuration of the signal processing unit 20. In FIG. 3, the 1st to 8th channels FL to FBR include band-pass filters BPF1 to BPF8, and variable amplifiers ATG1 to ATG8 at the following stage of the band-pass filters BPF1 to BPF8. The signal processing unit 20 also includes the test signal generator 3 for outputting a test signal for the speaker detection, switches SW11 to SW81 and SW12 to SW82 provided for the respective channels, and a switch SWN for selectively supplying the output signal DN from the test signal generator 3 to the band-pass filters of the respective channels.

In the sound source reproduction mode, the switches SWN and SW11 to SW81 are turned OFF and the switches SW12 to SW82 are turned ON. By this, the signals SFL to SSB are supplied to the corresponding band-pass filters BPF1 to BPF8, respectively. Each of the band-pass filters is set to the through-state, and supplies the input signal to the variable amplifiers ATG1 to ATG8 for all frequency bands. The variable amplifiers ATG1 to ATG8 amplify the signals of the respective channels by appropriate amplitudes for the respective channels in accordance with the control signal SG supplied by the coefficient operation unit 30, and supplies the amplified signals to the D/A converters 4FL to 4SBR in FIG. 1 as the digital signals DFL to DSBR. It is noted that, while the setting of the respective variable amplifiers ATG1 to ATG8 in the sound source reproduction mode is determined by an appropriate sound field correction process, the process is not directly related to the present invention, and hence the detailed description thereof will be omitted. Thus, in the sound source reproduction mode, the audio signals from the sound source 1 are reproduced by the channel unit.

On the other hand, in the speaker detection mode, the switches SWN and SW11 to SW81 are turned ON and the switches SW12 to SW82 are turned OFF. Therefore, the test signal DN is supplied from the test signal generator 3 to the respective band-pass filters BPF1 to BPF8, and the speaker detection process described later in detail is executed.

Figure 4:
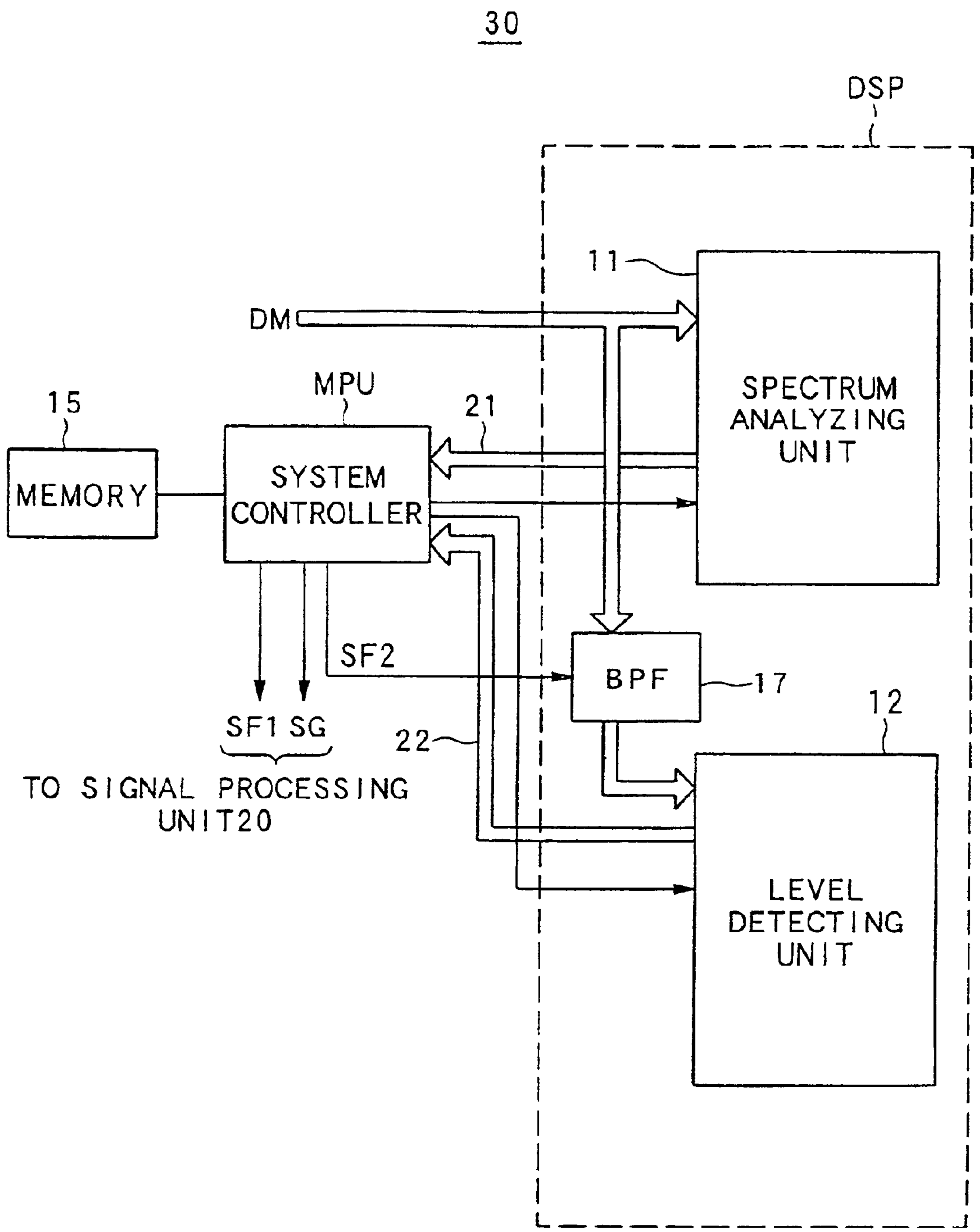
FIG. 4 is a block diagram showing a configuration of a coefficient operation unit shown in FIG. 2.

FIG. 4 shows a configuration of the coefficient operation unit 30. As shown, the coefficient operation unit 30 includes a spectrum analyzing unit 11, a level detecting unit 12, a system controller MPU, a band-pass filter 17, and a memory 15. it is noted that the spectrum analyzing unit 11, the level detecting unit 12 and the band-pass filter 17 constitute DSP (Digital Sound Processor).

In the speaker detection mode, the coefficient operation unit 30 generates the control signal SF1 for controlling the pass bands of the band-pass filters BPF1 to BPF8 in the signal processing unit 20, and also generates the control signal SG for controlling the amplitudes of the variable amplifiers ATG1 to ATG8 in the signal processing unit 20. The coefficient operation unit 30 supplies the control signals SF1 and SG to the signal processing unit 20.

Specifically, the spectrum analyzing unit 11 first receives the collected sound data DM obtained by collecting ambient sound by the microphone 8 in the state the speakers 6FL to 6SBR output no signal, and analyzes the spectrum of the collected sound data DM. Namely, the spectrum analyzing unit 11 divides the collected sound data DM into 9 frequency bands (e.g., 9 frequency bands from low-frequency band to high-frequency band), and detects the levels of the signals in the respective frequency bands to analyze the spectrum of the collected sound data DM of the environmental noise. Then, the spectrum analyzing unit 11 supplies the level data 21 indicating the levels of the respective frequency bands to the system controller MPU.

The band-pass filter 17 extracts the component of a certain frequency band and supplies it to the level detecting unit 12. The level detecting unit 12 detects the signal level of the frequency band that the band-pass filter 17 passed, and supplies the detection level data 22 to the system controller MPU.

The memory 15 stores threshold levels TH1 and TH2 described later, a signal curve determined in consideration of auditory characteristics of human being, and the speaker existence judgment result for the respective channels obtained by the speaker existence judgment process.

The system controller MPU receives the level data 21 of the respective frequency bands from the spectrum analyzing unit 11. The system controller MPU also receives the level data 22 indicating the level of the frequency band extracted by the band-pass filter 17, compares it with the threshold levels TH1 to TH2 stored in the memory 15 to generate the control signals SF1 and SG, and supplies the control signals SF1 and SG to the signal processing unit 20.

[2] Process in Speaker Detection Mode

Next, the description will be given of the speaker detection process executed in the speaker detection mode with reference to the flowchart shown in FIG. 5. When a user connects multiple speakers to the audio system 100 and then inputs an instruction by manipulating an input unit (not shown), the speaker detection mode is executed. It is noted that the speaker detection mode described below is executed by the system controller MPU controlling the respective components in the signal processing unit 2. The speaker detection process roughly includes a process to measure the environmental noise in the sound field such as a listening room and another process to determine the existence of the speakers thereafter. In the example shown in FIG. 5, these processes are executed for each channel.

When the user instructs the start of the speaker detection process, first a variable x indicating the channel number is set to "1" (step S1). By this, out of the first to eighth speakers SPFL to SPSBR shown in FIG. 1, the first speaker SPFL is selected.

Then, the signal processing circuit 2 detects the environmental noise level of the sound field space such as the listening room 7 in which the audio system 100 is installed (step S2). Specifically, the microphone 8 collects the ambient sounds, and the amplifier 9 and the A/D converter 10 generate the digital collected sound data DM and supply it to the spectrum analyzing unit 11 and the level detecting unit 12. At this time, the BPF 17 in the coefficient operating unit 30 is set to the through state by which the input signal is output as it is. The level detecting unit 12 detects the environmental noise level from the collected sound data DM thus input, and supplies it to the system controller MPU as the level data 22. Since the BPF 17 is set to the through state, the level data 22 indicates the environmental noise of the sound field in all frequency bands.

The system controller MPU judges whether or not the environmental noise level received as the level data 22 is smaller than a predetermined first threshold value TH1 (step S3). Here, the first threshold value TH1 is a noise level value used as a reference to determine whether or not the acoustic S/N ratio necessary for executing the speaker detection process is maintained.

If the environmental noise level is larger than the first threshold level TH1, the system controller MPU judges that the sound field is noisy and does not satisfy necessary S/N ratio, and executes the spectrum analysis of the environmental noise (step S4). Namely, the spectrum analyzing unit 11 divides the collected sound data DM into multiple frequency bands, detects sound level of each frequency bands, and supplies the level data 21 of each frequency band to the system controller MPU (step S4).

Then, the system controller MPU selects an optimum frequency band for the speaker detection based on the level data 21. The "optimum frequency band" is a frequency band silent enough to perform the speaker detection, and specifically a frequency band that has an acoustic S/N ratio larger than a predetermined reference value. Then, the system controller MPU determines a second threshold value TH2 based on the S/N ratio of the selected frequency band, and stores the second threshold value TH2 in the memory 15. The method of determining the optimum frequency band and the second threshold value will be described later in detail.

Further, the system controller MPU generates the control signal SF1 to control the characteristics of the band-pass filters BPF1 to BPF8 such that the signal of the optimum frequency band is passed, and supplies the control signal SF1 to the respective band-pass filters BPF1 to BPF8. The system controller MPU also generates the control signal SF2 to set the pass-band of the band-pass filter 17 to the optimum frequency band and supplies the second control signal SF2 to the band-pass filter 17. The system controller MPU also generates the control signal SG to set the gain corresponding to the optimum frequency band to the respective variable amplifiers ATG1 to ATG8, and supplies them to the variable amplifiers ATG1 to ATG8 (step S5). Thus, the band-pass filters BPF1 to BPF8 are set to the characteristics to pass the signal in the optimum frequency band.

On the other hand, if the environmental noise level is smaller than the first threshold value TH1, the system controller MPU judges that the sound field satisfies the necessary acoustic S/N ratio for the speaker detection. Then, the system controller MPU determines the filter coefficients such that all of the band-pass filters BPF1 to BPF8 are set to the through state, and supplies the coefficients to the respective band-pass filters BPF1 to BPF8 as the control signal SF1. Further, the system controller MPU generates the control signal SG to set the amplification factors of the respective variable amplifies ATG1 to ATG8 to predetermined gains corresponding to the through state, and supplies the control signal SG to the variable amplifiers ATG1 to ATG8. The system controller MPU further sets the second threshold value TH2 to a predetermined value (step S6).

In this way, the measurement of the environmental noise in the sound field is completed, and then the speaker existence judgment is executed.

The system controller MPU turns the switches SWN and SW11 ON and turns the other switches OFF. The test signal generator 3 generates the test signal DN, and the test signal DN is output by the speaker 6FL after passing through the band-pass filter BPF1 of the first channel and the variable amplifier ATG1. The microphone collects the test sound and supplies the collected sound data DM to the level detecting unit 12 via the band-pass filter 17 shown in FIG. 4.

If the judgment in step S3 indicates that the environmental noise is smaller than the first threshold TH1 (i.e., the environmental noise is small), the band-pass filter 17 is set to the through state in step S6, and the level detecting unit 12 receives the level data 22 indicating the level of the test signal in all frequency bands. On the other hand, if the judgment in step S3 indicates that the environmental noise is larger than the first threshold TH1 (i.e., the environmental noise is large), the band-pass filter 17 is set to the optimum frequency band in step S4, and hence the level detecting unit 12 receives only the optimum frequency band component of the collected data DM, and supplies the level data 22 indicating that level to the system controller MPU.

Figure 7:
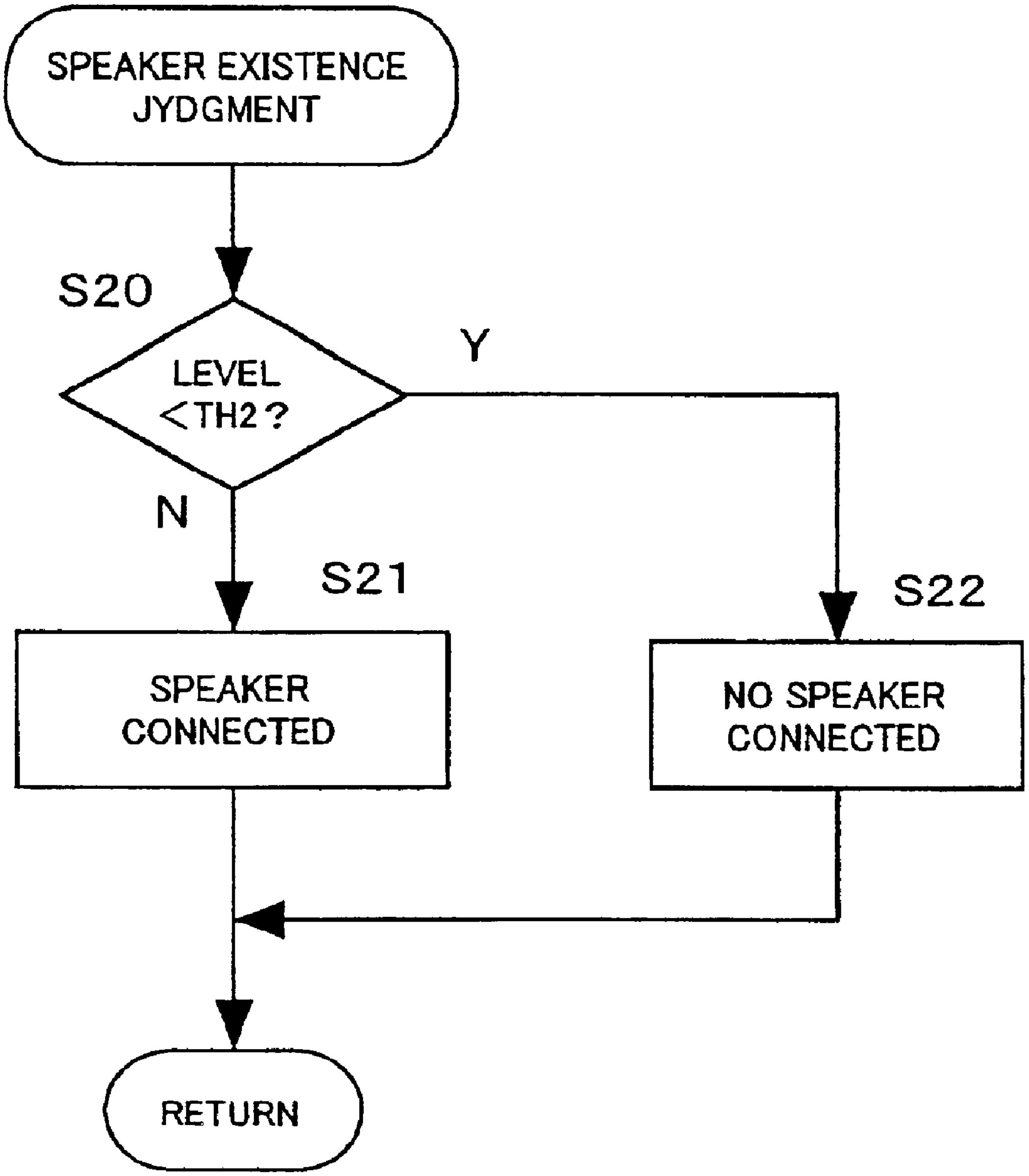
FIG. 7 is a flowchart showing a speaker existence judgment step shown in FIG. 5.

Then, the system controller MPU compares the received level data 22 with the second threshold value TH2 determined in step S5 or S6 to judge the existence of the speaker (step S8). The detail of the speaker existence judgment process is shown in FIG. 7. In FIG. 7, the level data 22 is compared with the second threshold value TH2 (step S20). If the level data 22 is larger than the second threshold value TH2, it is judged that a speaker is connected to the channel (step S21). On the contrary, if the level data 22 is smaller than the second threshold value TH2, it is judged that no speaker is connected to the channel (step S22). Then, the process returns to the main routine shown in FIG. 5.

When the speaker existence for the first channel is thus judged, then the system controller MPU stores the judgment result in the memory 15 (step S9). Then, the system controller MPU increments the variable x of the channel number by 1 (step S10), and then judges whether or not the variable x is larger than the number of the channels (step S11). If the variable x is not larger than the channel number, the process goes back to step S2 to execute the speaker judgment for the next channel (steps S2 to S10). On the other hand, if the variable x is larger than the channel number (step S11; Yes), the process ends because the speaker existence has already been judged for all channels.

By the speaker detection process described above, if the environmental noise is small (more precisely, the S/N ratio is large), the test signal of all frequency bands is output, and the microphone 8 collects the test sound to judge the existence of the speaker. On the other hand, if the environmental noise is large (more precisely, the S/N ratio is small), the speaker existence is judged by using the test signal of the optimum frequency band in which the S/N ratio is large enough. Therefore, since the speaker judgment is executed by using the test signal in the optimum frequency band in which the S/N ratio higher than a reference value is maintained, the speaker existence may be correctly detected automatically even in the sound field having relatively large environmental noise.

Figure 5:
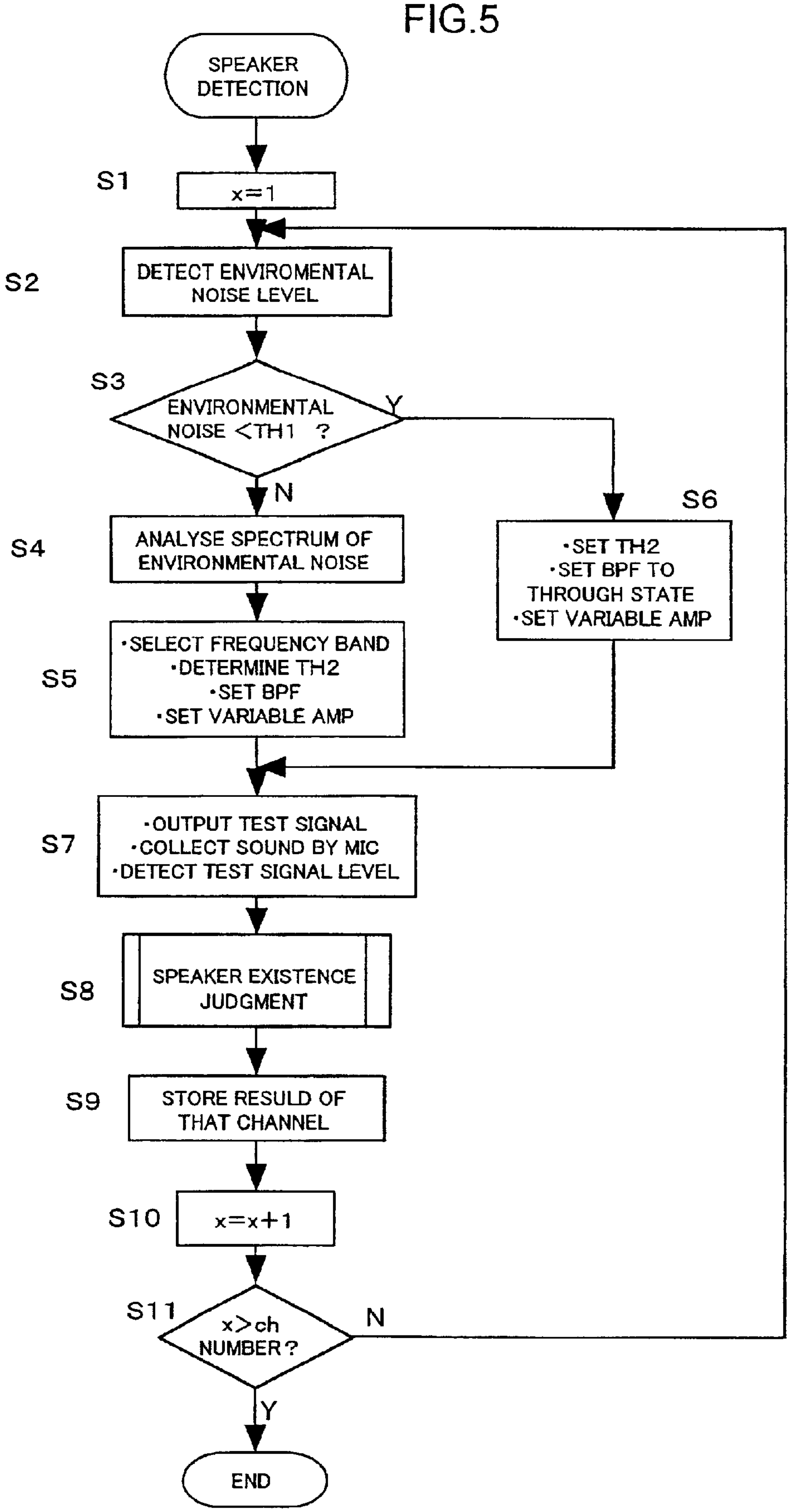
FIG. 5 is a flowchart showing a speaker detection process.

In the process shown in FIG. 5, the respective band-pass filters BPF1 to BPF8 are controlled such that the pass-bands of band-pass filters BPF1 to BPF8 in the signal processing unit 2 are set to the optimum frequency band. However, only the pass-band of the band-pass filter corresponding to the channel (indicated by "x") subject to the speaker existence judgment may be controlled.

Alternatively, only the band-pass filter 17 in the coefficient operating unit 30 maybe set to the optimum frequency band, and the respective band-pass filters BPF1 to BPF8 may be set to the through state (i.e., passing all frequency bands) This is because, even if the band-pass filters BPF1 to BPF8 are set to the all frequency bands, by setting the band-pass filter 17 to the optimum frequency band, the level detecting unit 12 can detect the test signal level of only the optimum frequency band.

However, the test signal of the frequency band subject to the level detection by the level detecting unit 12 is eventually output by the speaker, by setting the band-pass filters BPF1 to BPF8 on the test signal reproduction side to the optimum frequency bands, there is no need to output the test signal of the unnecessary frequency band (it may include large environmental noise because it is the frequency band other than the optimum frequency band) by the speaker. This prevents the test signal output by the speaker from giving uncomfortable noisy sound to persons in the sound field environment in which the speaker is installed. In addition, since it is only needed to output the test signal in the optimum frequency band, the output power of the speaker may be relatively reduced and the S/N ratio may be increased, thereby advantageously improving the detection accuracy.

While the speaker detection process shown in FIG. 5 judges the speaker existence by determining the optimum frequency band for each channel in step S4, the optimum frequency band determined for the first speaker may also be used for the other channels. It is inherently preferred that the optimum frequency band is determined for each channel individually. However, normally the determination of the optimum frequency band and the speaker existence judgment for each channel are executed in a relatively short time period, the optimum frequency band determined for the first channel may be appropriately used for other channels, unless the environmental noise state in the sound filed space suddenly varies. This can simplify and accelerate the speaker existence judgment process on the whole.

[3] Method of Determining Optimum Frequency Band and Second Threshold Value TH2

Next, the method of determining the optimum frequency band in step S5 will be described. When the environmental noise of the sound field is larger than a predetermined level (first threshold TH1), the detection accuracy is low if the speaker existence is judges using the test signal in all frequency bands. Therefore, by outputting the test signal only in a particular frequency band and by detecting the level only in the frequency band, the speaker existence may be accurately detected with eliminating the influence of the environmental noise. In this sense, it is preferred that the optimum frequency band is selected from some frequency bands, out of preset multiple frequency bands (9 frequency bands in this embodiment), that have the acoustic S/N ratio larger than a given reference value. A most theoretical method of selecting one frequency band from the candidate frequency bands having S/N ratio larger than the reference value is to select the frequency band having a largest S/N ratio. However, in more actual sense, if the acoustic S/N ratio larger than the predetermined reference value is ensured, the optimum frequency band may be selected in consideration of parameters other than the S/N ratio.

One characteristic point of the present invention is to consider the auditory characteristic of human being in the evaluation of the S/N ratio. Generally, the auditory characteristic of human being is not flat for all frequency ranges, and there are frequency bands in which the auditory sensibility is high and low. Therefore, even if the test signal of the same level is output from the speaker, the user may feel the test signal of the frequency range with high auditory sensibility noisy or uncomfortable, and may hardly hear the test signal of the frequency range with low auditory sensibility.

Figure 6:
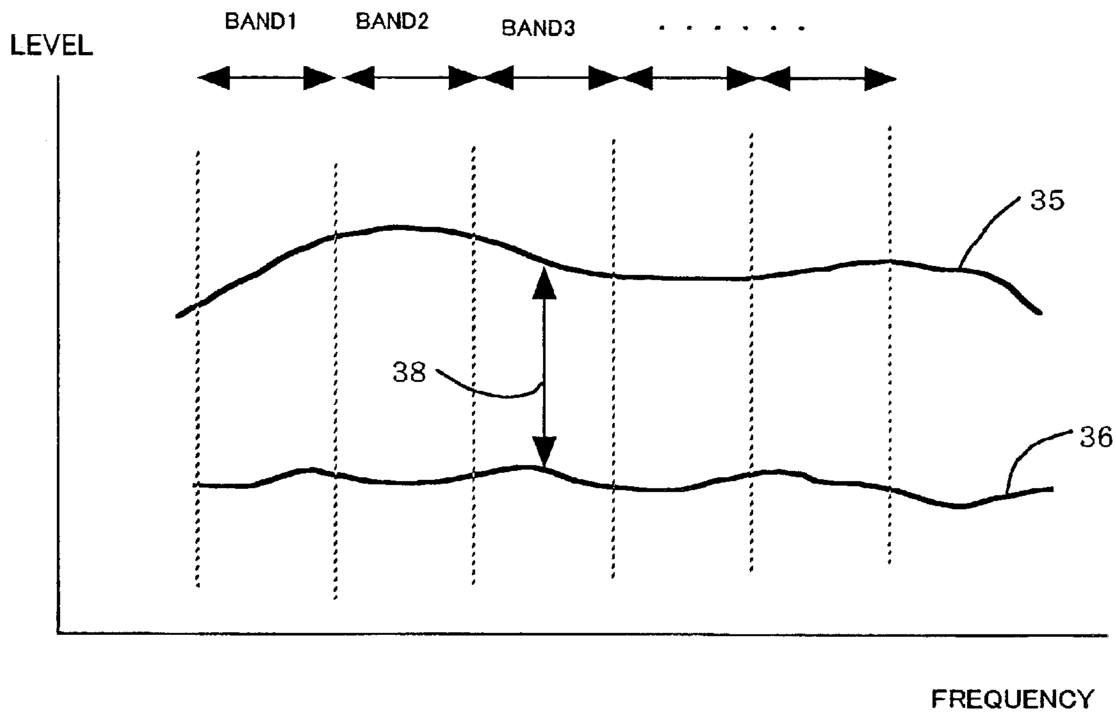
FIG. 6 is a graph showing examples of a signal curve and a noise curve.

In the above viewpoint, in the present invention, a maximum allowable output level of the test signal is set for each frequency band in consideration of the auditory characteristic of human being. The maximum allowable output level is set to a highest level insofar as the user does not feel the test signal noisy or harsh, and the maximum allowable output level is defined in a form of a signal curve. An example of the signal curve is shown in FIG. 6. In FIG. 6, the signal curve 35 shows the maximum allowable output level of the test signal. The signal curve 35 may be predetermined in accordance with the auditory sensitivity curve of human being, or may be determined experimentally by actually outputting test signals of various frequency bands from the speaker and listening the output sound of the test signal. The data of the signal curve 35 thus determined is stored in the memory 17.

On the other hand, in step S2 of FIG. 5, the spectrum analyzing unit 11 detects the environmental noise levels of the sound field for the respective frequency bands, and supplies them to the system controller MPU as the level data 21. Based on the result of the noise level detection, the system controller MPU determines the noise curve 36 and stores it in the memory 15 in the same manner. When the optimum frequency band is selected in step 5, the system controller MPU selects the frequency bands which S/N ratio is larger than the predetermined reference value (i.e., frequency bands for which the distance 38 between the signal curve 35 and the noise curve 36 is large) based on signal curve 35 and the noise curve 36 shown in FIG. 6, and determines one of those frequency bands, that has a maximum S/N ratio or that is determined in consideration of the other parameters, as the optimum frequency band.

Further, the system controller MPU determines the second threshold value TH2 in step S5 based on the signal curve 35 and the noise curve 36 of the optimum frequency band thus determined. The second threshold value TH2 may be the middle value of the signal curve 35 and the noise curve 36. Thus, by determining the signal curve 35 in consideration of the auditory characteristic of human being and selecting the optimum frequency band from the frequency bands having S/N ratio larger than a reference value based on the signal curve 35, the speaker existence detection can be executed highly accurately with eliminating the influence of the environmental noise. In addition, since the signal curve 35 prescribes the allowable output level of the test signal and no test signal of level larger than the signal curve 35 is output by the speaker, it is possible to avoid the user in the sound field feeling the test signal noisy or harsh.

Figure 9:
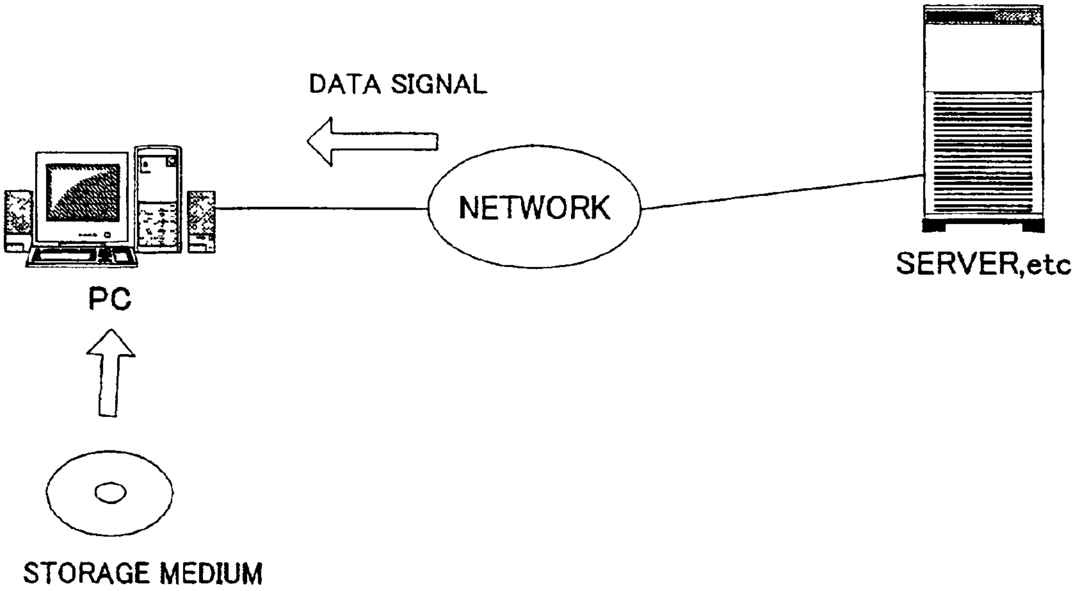
FIG. 9 shows a concept of application of the present invention to computer program.

In the above described embodiments, the signal processing is achieved by the signal processing circuit. Alternatively, the signal processing may be designed as a program to be executed on a computer. The concept of this application is shown in FIG. 9. In that case, the program may be supplied in a form of storage medium such as CD-ROM or DVD, or supplied via the communication path through the network. The computer for executing this program may be a personal computer, to which an audio interface for multiple channels, multiple speakers and a microphone are connected as peripheral equipments. In the case of executing the above program in the personal computer, the measurement signal is generated by a sound source provided inside or outside of the computer, the measurement signal is output via the audio interface or speaker and the output sound is collected by the microphone. Thus, the automatic sound field correcting system shown in FIG. 1 may be achieved by a computer.

As described above, according to the present invention, the spectrum of the environmental noise is examined and the speaker existence detection is executed by using the frequency band with smaller noise, and hence the accuracy of speaker detection may be improved even in an environment with larger environmental noise. In addition, by inserting a filter passing only the optimum frequency band to the signal output side of the test signal, the output of the test signal of unnecessary frequency band (generally having lager noise) may be avoided, and a person in the sound field does not feel uncomfortable. Further, since only the test signal of the optimum frequency band is output, the output power may be increased to improve the S/N ratio against the environmental noise in the sound field. Thus, the speaker detection can be performed more accurately.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2001-133573 filed on Apr. 27, 2001 including the specification, claims, drawings and summary is incorporated herein by reference in its entirety.

What is claimed is:

1. A speaker detecting device comprising:

an output terminal for outputting a signal to drive a speaker;

a test signal supplying unit for supplying the test signal to the output terminal;

a test sound detecting unit, installed in an acoustic space in which the speaker is installed, for detecting a test sound corresponding to the test signal; and a speaker existence judging unit for judging whether or not a speaker is connected to the output terminal by comparing a signal level of the test sound, detected by the test sound detecting unit when the test, signal supplying unit supplies the test signal to the output terminal, with a predetermined threshold level.

2. A speaker detecting device according to claim 1, further comprising:

an environmental noise detecting unit for detecting environmental noise in the acoustic space; and an optimum frequency band determining unit for determining an optimum frequency band of the test signal by analyzing a level of the environmental noise in terms of spectrum, wherein the speaker existence judging unit compares the level of the signal in the optimum frequency band, out of the signals detected by the test sound detecting unit, with the predetermined threshold level.

3. A speaker detecting device according to claim 2, wherein the optimum frequency band determining unit determines the frequency band having a highest acoustic S/N ratio as the optimum frequency band.

4. A speaker detecting device according to claim 3, wherein the optimum frequency band determining unit comprises:

a unit for storing a predetermined signal curve data;

a unit for detecting the level of the environmental noise detected by the environmental noise detesting unit for each of multiple frequency bands to produce a noise curve data; and a unit for determining the frequency band having the highest acoustic S/N ratio as the optimum frequency band by comparing the curve data with the noise curve data.

5. A speaker detecting device according to claim 4, further comprising a threshold level setting unit for setting a level between the signal curve data and the noise curve data in the optimum frequency band to the predetermined threshold level.

6. A speaker detecting device according to claim 2, wherein the speaker existence judging unit judges the existence of the speaker based on the signal level in the optimum frequency band when the level of the environmental noise is larger than a predetermined reference level, and judges the existence of the speaker based on the signal level of all frequency bands when the level of the environmental noise is smaller than the predetermined reference level.

7. A speaker detecting device according to claim 3, wherein the test signal supplying unit supplies only a component of the test signal in the optimum frequency band to the output terminal.

8. A speaker detecting device according to claim 2, wherein the test sound detecting unit and the environmental noise detecting unit are integrally configured as a single acoustic detecting unit.

9. A program storage device readable by a computer having an output terminal for outputting a signal to drive a speaker and tangibly embodying a program of instructions executable by the computer to control the computer to function as a speaker detecting device comprising:

a test signal supplying unit for supplying the test signal to the output terminal;

a test sound detecting unit, installed in an acoustic space in which the speaker is installed, for detecting a test sound corresponding to the test signal; and a speaker existence judging unit for judging whether or not a speaker is connected to the output terminal by comparing a signal level of the test sound, detected by the test sound detecting unit when the test signal supplying unit supplies the test signal to the output terminal, with a predetermined threshold level.

10. A computer data signal embodied in a carrier wave and representing a series of instructions which causes a computer, having an output terminal for outputting a signal to drive a speaker, to function as a speaker detecting device comprising:

a test signal supplying unit for supplying the test signal to the output terminal;

a test sound detecting unit, installed in an acoustic space in which the speaker is installed, for detecting a test sound corresponding to the test signal; and a speaker existence judging unit for judging whether or not a speaker is connected to the output terminal by comparing a signal level of the test sound, detected by the test sound detecting unit when the test signal supplying unit supplies the test signal to the output terminal, with a predetermined threshold level.

11. The speaker detecting device of claim 1, wherein, the speaker existence judging unit is connected to an output connection of the test sound detecting unit, the test signal supplying unit, the test sound detecting unit, and the speaker existence judging unit are configured to operate in a speaker detection mode, which speaker detection mode is executed at times other that during a sound source reproduction mode, in the speaker detection mode, the test signal from the test supplying unit is output to the speaker so that the speaker, when in existence by connection to the output terminal, generates the test sound, the test sound detecting unit detects the test sound from the speaker and, via the output connection to the speaker existence judging unit, sends the detected test sound as a returned test signal to detect the existence of the speaker by comparing the signal level of the returned test signal to the predetermined threshold level.

* * * * *